Jan. 20, 1959 W. H. BRAND ET AL 2,870,387
MEASURING AND CONTROLLING SERVO-MOTOR SYSTEM
Filed March 12, 1957 2 Sheets-Sheet 2

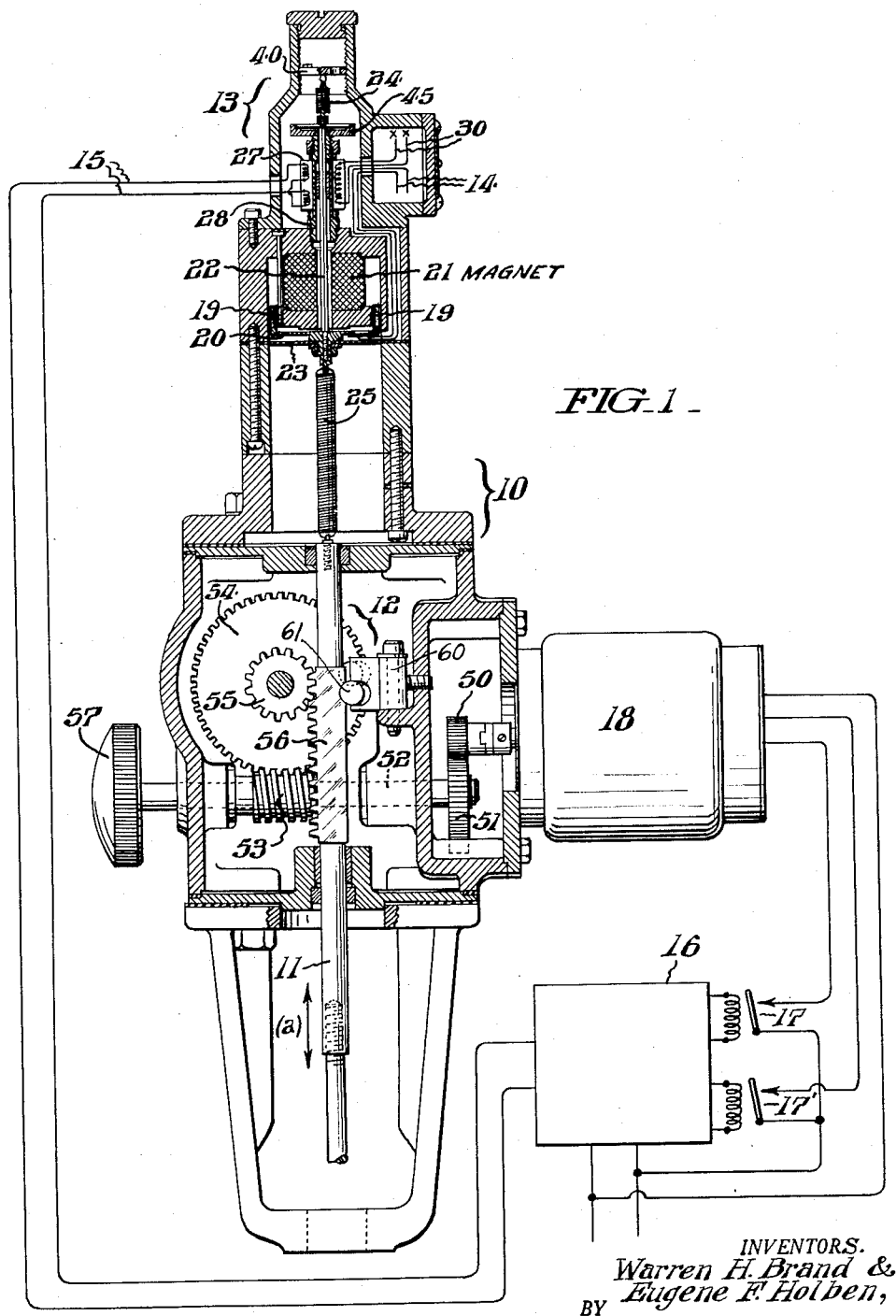

INVENTORS.
Warren H. Brand &
BY Eugene F. Holben,
Paul & Paul
ATTORNEYS

United States Patent Office 2,870,387
Patented Jan. 20, 1959

2,870,387

MEASURING AND CONTROLLING SERVO-MOTOR SYSTEM

Warren H. Brand, Blue Bell, and Eugene F. Holben, Ardsley, Pa., assignors to Conoflow Corporation, Philadelphia, Pa., a corporation of Pennsylvania Application March 12, 1957, Serial No. 645,510

13 Claims. (Cl. 318—32)

This invention relates to an automatic actuating means, and more specifically relates to an actuating device for a movable member, which device is automatically operative in response to an impulse, such as a change of electrical current or voltage, for example.

Automatic actuating and controlling devices in accordance with this invention are particularly useful in conjunction with systems for controlling the value of a variable condition such as temperature, pressure or flow, for example, and have particular relation to the adjustment of a flow-controlling apparatus which is variably positioned to regulate continuously the flow of a fluid or the like.

It is an object of this invention to provide an improved apparatus for controlling a variable member in response to a variation of an impulse. More particularly, it is an object of this invention to control the variable member exactly linearly and very rapidly with the change of the impulse.

Another object of this invention is to provide an apparatus of the character indicated above, which utilizes the force-type balance principle in controlling the variable member in relation to the impulse.

Still another object of this invention is to provide an automatic actuator mechanism which is linearly responsive to a regulating impulse and which is electrically operated and does not require any intermediate operating fluids such as gases or liquids.

Still another object of this invention is to provide a controlling device of the character indicated, which can be mounted in any physical position, including horizontal, vertically upright, vertically inverted, and all intermediate positions.

Still another object of this invention is to provide an automatic valve controlling device having the ability to move the valve either toward its open or closed position in response to an impulse of predetermined direction, depending upon the initial setting of the device. Another object is to provide such a device, wherein this initial setting can readily be changed.

Still another object of this invention is to provide a device of the character just indicated, which develops full torque for either motion, whether such motion be direct or in reverse.

Still another object of this invention is to provide a device which is fail-safe in the sense that, upon failure of signal input, the actuator member shifts to either fully open or fully closed position, and upon failure of the utility power the actuator member remains in the same position and may be operated manually if desired.

Other objects and advantages of this invention, including the simplicity and economy of the same, as well as the sensitivity and powerful action of the apparatus without waste of power, will further become apparant hereinafter and in the drawings, whereof:

Fig. 1 is a view in vertical section of one preferred form of this invention.

Figure 3:
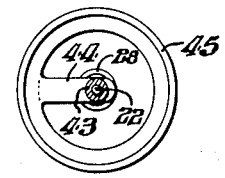
Fig. 3 is a sectional view taken as indicated by the lines and arrows III—III which appear in the upper central portion of Fig. 2.

It will be appreciated that the specific structure shown in the drawings is intended to illustrate only one form of this invention, which is capable of reduction to practice in a wide variety of forms and embodiments. Also, in the specification which follows, specific terms will be utilized for the sake of clarity, such terms being intended to refer particularly to that structure which is shown in the drawings, and not being intended to define or limit the scope of the invention, which is thereafter defined in the claims.

Turning now to the specific form of the invention selected for illustration in Fig. 1 of the drawings, the number 10 designates generically a housing in which is carried an actuator stem 11 which is capable of reciprocating vertically up and down as indicated by the arrow (a). Let it be assumed that it is desired to control the nature and extent of such reciprocation, it being understood that the actuator stem 11 is intended to be connected to a valve or other apparatus which in turn controls the flow of fluid, for example, in a device or apparatus.

Also contained in the housing 10 is a mechanical actuating mechanism comprehensively designated by the number 12, and which is driven by an electric motor 18. Motor 18 is either direct current or alternating current. Located in the upper portion of the housing 10 is an electrical actuating section 13 which includes a connection for a pair of wires 14, 14 through which a low-current, low-voltage (direct current) input signal is introduced. This input signal varies in a predetermined manner with respect to the variable which is being controlled. The electrical actuating section 13 also includes a pair of output wires 15, 15 which lead to an amplifier 16, which in turn operates a pair of relays 17, 17' which are connected electrically to operate the motor 18.

It will accordingly be appreciated that, in summary, the parts of the apparatus shown in the drawings include generally a means for impressing an input signal, an electrical output which is responsive to changes of that signal, an amplifier for amplifying the electrical output, relays operative in response to the output of the amplifier, an electric motor operative in response to the relays, a mechanical driving means operative in response to the motor, and an actuator stem which is operated by the mechanical driving means. In this manner, the actuator stem 11 is operated in response to the change of the input signal impressed through the input lines 14, 14.

Figure 2:
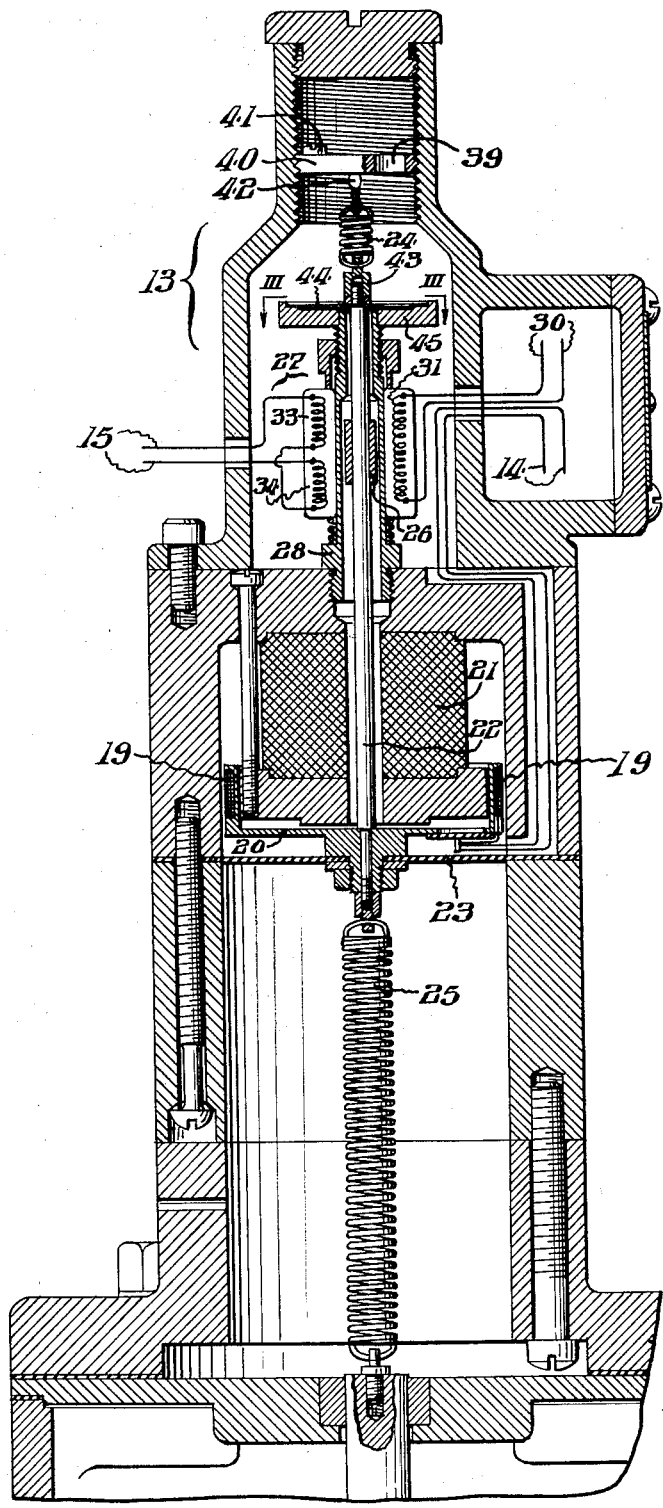
Fig. 2 is a view in vertical section, considerably enlarged, of the upper portion of the apparatus shown in Fig. 1.

The construction and operation of the electrical actuating section 13 of the device appear in particular detail in Figs. 2 and 3 of the drawings. The input signal (usually a direct current input signal) is conducted through the wires 14, 14 to an input signal coil 19, which is preferably a multi-layer (voice) coil constructed and designed to provide a magnetic field of the maximum density at the coil. A 3000 ohm input signal voice coil, for example, has been found to be an excellent coil for the purpose of this invention. A coil form 20 is provided for the input signal coil 19, which floats in accordance with the movement of the voice coil 19. The input signal coil 19 is mounted in the magnetic field of a magnet 21, which is a permanent magnet or an electro-magnet and is fixed to the structure of the housing, and which has a central bore through which a rod 22 extends. The rod 22 is connected at its lower end to the center of the coil form 20. The coil form 20 is, in turn, guided by an elastic diaphragm 23 which acts as a bearing and centers the rod 22, and which additionally seals the device against the undesirable entrance of dust, dirt, etc.

The rod 22 extends freely axially through a sleeve 28 which is axially arranged and fixed in the electrical portion of the control apparatus, and its upper end is affixed to the lower end of a tension spring 24. The lower end of the rod 22 is, in turn, affixed to the upper end of a range spring 25. Both springs 24 and 25 are in tension, and the rod 22 is in balance between the ends of the springs, and completely free to move in response to any external force which might be exerted upon the rod 22. Current introduced into the input signal coil 19 causes such a force, which is parallel to the axis of the coil. It will be appreciated that any change of the direct current input signal introduced through the wires 14, 14 in any direction causes a corresponding change of magnetic force applied by the input signal coil 19, which in turn causes the coil 19 (together with the rod 22) to shift axially in a corresponding direction, all in accordance with the well-known left hand thumb rule.

Surrounding an upper portion of the rod 22 is a linear differential transformer 27, which has a core 26 that is coupled by the rod 22 to the coil 19. The wires 30, 30 designate connections extending from the relay amplifier 16 which lead to the primary 31 of the linear differential transformer 27. The core 26 of the linear differential transformer 27 is preferably an iron slug which is located between the primary 31 of the transformer and its two parallel and adjacent secondary windings 33, 34. The secondary windings are wound such that their resultant coupled voltages are 180 degrees out of phase and their magnitude is dependent upon the position of the core 26 in the transformer 27. In the neutral position, the combined output of the secondary is zero, but when the core 26 is displaced from its neutral position, the output is phased one way or the other, depending upon the direction in which the core 26 is displaced. In either case, the amplitude of the secondary output is directly dependent upon the distance through which the core 26 has been displaced from its neutral position.

The secondaries 33, 34 are connected by the lines 15, 15 to the relay amplifier 16, all as appears in more particular detail in Fig. 1. This secondary voltage applied to the amplifier 16 is precisely linear over a percentage proportional band with respect to the change in the input signal introduced through the wires 14, 14. This band of proportionality permits precise setting of gain control in the amplifier 16 thereby providing stability under all conditions of operation.

It will be appreciated that the axial shifting movement of the iron core 26, accompanied by a corresponding movement of the rod 22, causes a change of tension at the spring 24 and also a tension change at the range spring 25. However, the range spring 25 is so constructed and selected of such material and is operated within such a range that it has the ability to undergo a substantial change of length with a proportional change of tension for such change of length.

Referring to the specific structure of the device, the number 40 designates a wafer which is threaded within the upper part of the housing and which may be turned to provide a proper zero setting for the spring 24. The wafer 40 has a self-tapping screw 41 and holes 39 which are engageable by a specially shaped wrench for adjusting the setting. The wafer 40 includes a swivel member 42, to which the end of the spring 24 is connected.

The lower end of the spring 24 is connected through a hole in a connecting member 43 fixed to a flexible finger 44 which is connected in turn to the end of rod 22. Flexible finger 44 is carried by a ring member 45 construction of which appears more particularly in Figs. 2 and 3.

Referring now more particularly to Fig. 1 of the drawings, the motor 18 is connected through gears 50, 51 to drive a shaft 52 carrying a worm gear 53 which turns a large gear 54 connected to a pinion 55 which operates a rack 56 which is rigidly connected to reciprocate the actuator stem 11. The number 60 designates a bracket having a pin 61, constituting a support for the rack 56. The shaft 52 also has a hand knob 57. The motor 18 is a reversible motor, operable in response to the relays 17, 17', the former of which operates in reverse and the latter in a forward direction. Accordingly, it will be appreciated that, depending upon which relay 17, 17' is closed, the motor 18 operates either forward or in reverse, thereby moving the actuator stem 11 either up or down.

The relay amplifier 16 which operates the relays 17, 17' may be any amplifier of conventional construction which senses the magnitude and phase relationship of the output voltage of the linear differential transformer, amplifies this voltage and operates either relay 17 or 17', depending upon the phase of the input voltage from the transformer 27. The circuit details of the amplifier do not of themselves constitute a part of this invention, and they are not, therefore, described in detail herein.

The throwing in and out of the relays 17, 17' is dependent upon the magnitude of the input voltage of the relay, each relay being throwable to operative position in response to an input of predetermined level and self-returning to an inoperative position at an input below another predetermined level (substantially zero).

It will accordingly be appreciated that the primary sensing element in accordance with this invention, as shown in the drawings, consists of a multi-layer coil on a coil form mounted in the magnetic field of a permanent magnet or electromagnet. The introduction of a direct current to the coil produces a motion of the coil in a direction parallel to its axis. The coil form is mechanically coupled to the core of a linear differential transformer whose primary is excited by an alternating current. The secondary consists of two windings wound such that their resultant coupled voltages are 180 degrees out of phase, and their magnitude is dependent upon the axial shift of position of the core in the transformer. When the core is in its neutral position, the combined output of the secondary is zero whereas, with the core displaced from its neutral position, the output is phased one way or the other, depending upon which direction the coil is displaced from the neutral position. Also, the amplitude of the output is dependent upon the distance through which the core is displaced away from its neutral position.

It will further be appreciated that the secondary of the linear differential transformer 27 is electrically fed to the input of the relay amplifier, and that the amplifier senses the magnitude and phase relationship of the output voltage of the linear differential transformer, as heretofore described.

The sequence of operation of the device is as follows. With a given direct current in the coil 19 and the system in the neutral position, a small change in the input current produces a motion of the coil 19 which moves the core 26 of the linear differential transformer 27 out of the neutral position. The displacement of the core 26 produces an electrical output of the transformer 27 which is amplified by the amplifier 16 and operates a relay 17 or 17'. The motor 18 then operates in the proper direction and produces a motion of the actuator stem which, in turn, adjusts the tension of the range spring 25 to bring the coil 19 back to its neutral position. Upon reaching the neutral position, the linear differential transformer output drops to substantially zero, the relay 17 or 17' drops out and the motor 18 stops.

An important purpose and advantage of the zero adjusting spring 24 is to adjust the neutral position of the range of the coil 19 for any mounting position, thereby compensating for weights of parts in various mounting positions. In addition, by adjusting the set point of the zero spring 24 and reversing the leads 14, 14 to the coil 19, the unit can be made to operate with either direction of stem action with respect to a given or predetermined input signal.

The apparatus is an electro-mechanical sensing device wherein the rod 22 is a mechanical coupling device for balancing forces between the springs, from which it is suspended, and the force exerted by the input signal coil 19. This form of the device, utilizing the force-balance principle, is highly effective and advantageous. The device is free of frictional effects, does not have parts that wear rapidly, and is truly linear in its response.

It is important and advantageous that the core of the linear differential transformer is maintained balanced and in suspension between the frame or housing of the unit, and the driven or controlled element. Three forces, in balance, are applied to the core or to the floating rigid rod on which it is fixed. One force results from the tension of the zero-adjust spring, which effectively sets and determines the smallest increment of motion of the null-seeking core. Another force is that applied by the input signal coil, which force has a direction and magnitude in accordance with the applicable electrical laws, which force is reversed in direction by reversing the polarity of the input signal. The third force is that applied by the range spring, which force is variable in gradient to provide any desired band of travel for any given (design) force produced by the input signal coil.

Although the drawings show a motor connected through gears for actuating the member 11, it will be appreciated that various equivalent elements may be substituted. For example, a hydraulic mechanism may be utilized, having a piston or the like connected to the end of the range spring, and actuated in opposite directions by solenoids operated by the relays 17, 17'. Moreover, any other similar means, as will become apparent to persons skilled in the art, may be substituted.

The apparatus having the features of construction and arrangement disclosed herein has the advantages of minimum inertia and absence of friction from contacting or sliding elements, resulting in precision accuracy and exceedingly long life. The apparatus consumes power to the motor only when the movable element is being re-positioned.

Another important advantage of the apparatus of this invention is that the control mechanism may be applied to very large or to very small movable members, since the limits of maximum power are dictated only by the power in the electric motor, the characteristics of the motor, and the gearing available.

Another advantage of the control system is that the relays 17, 17' may be connected to operate solenoids for controlling the operation of any standard valve actuating mechanism either remotely or locally placed.

Although this invention has been described with particular reference to one specific embodiment thereof, it will be appreciated that various modifications may be made, including reversals of parts, substitution of equivalent elements for those specifically shown and described, and the use of certain features without the use of other features, all without departing from the spirit and scope of the invention, as defined in the appended claims.

Having thus described our invention, we claim:

1. In an apparatus for controlling movement of a movable member in response to an electric impulse, the combination which comprises a rigid member suspended in a free condition between opposed resilient supporting members, magnetic means fixed to said rigid member and connected electrically to receive said impulses, a floating member which is fixed to said rigid member, responsive means free of contact with said floating member but responsive to a shift of position thereof, means connecting said responsive means to operate said movable member in response to movement of said floating member, and means connecting said movable member to readjust the position of said floating member in response to movement of said movable member.

2. In an apparatus for controlling movement of a movable member in response to an electric impulse, the combination which comprises a rigid member balanced in space between opposed resilient supporting members, a magnetic coil fixed to said rigid member and connected electrically to receive said impulses, a fixed magnet adjacent said coil in a position to cause said coil to move in response to said impulses, an electrically responsive means spaced from said coil for actuation in response to shifting movement of said rigid member, means connecting said electrically responsive means to an amplifying means, and means actuated by said amplifying means to operate said movable member in predetermined directions in response to movement of said rigid member in predetermined directions relative to said resilient supporting members, and mechanical means connecting said movable member to said rigid member to re-position said rigid member.

3. In an apparatus for controlling movement of a movable member in response to an electric impulse, the combination which comprises a rigid member balanced in space between opposed resilient supporting members, magnetic means fixed to said rigid member and connected electrically to said impulses, a linear differential transformer having a primary and a pair of secondaries physically fixed and spaced apart from said rigid member, said linear differential transformer having a core which is fixed to said rigid member intermediate but free of contact with said primary and secondaries, means for imposing alternating current on said primary, an amplifier connected to said secondaries, said amplifier having circuits sensing the magnitude and phase relationship of the output voltages of said secondaries, relays actuated by said amplifier, and electric motor means connected for actuation by said relays and connected mechanically to said movable member, said movable member being connected to said rigid member to move said core in response to movement of said movable member.

4. In an apparatus for controlling movement of a movable member in response to an electric impulse, the combination which comprises a rigid elongated rod balanced in space between opposed springs attached to its ends, an input signal coil fixed to said rod and connected electrically to receive said impulses, a magnet adjacent said input signal coil causing said coil to move axially in response to change of said impulse, a transformer having a primary and a pair of secondaries physically fixed and spaced apart from said rigid rod, said transformer having a core which is fixed to said rigid member intermediate but free of contact with said primary and secondaries, means for adjusting one of said springs thereby adjusting the location of the core axially, means for imposing alternating current on said primary, and means connecting said secondaries to operate said movable member in response to movement of said core relative to said secondaries, said movable member being affixed to said rigid rod and movable along the line of the axis of said rod.

5. In an apparatus for controlling movement of a movable member in response to a direct current electric impulse, the combination which comprises an elongated rigid member balanced in space between a zero adjust spring and a range spring attached to its ends, resilient supporting members affixed to its ends and axially shiftable therebetween, a multi-layer coil fixed to said rigid member and connected electrically to said impulses, a magnet having a field in which said multi-layer coil is mounted, a transformer having a primary and a pair of secondaries physically fixed and spaced apart from said rigid member, said transformer having a core which is fixed to said rigid member intermediate but free of contact with said primary and secondaries, means for imposing alternating current on said primary, means connecting said secondaries to operate said movable member in response to movement of said core relative to said secondaries, and means connecting said movable member to an end of said range spring.

6. In an apparatus for controlling reciprocating movement of a reciprocable member in response to an electric impulse, the combination which comprises a rigid elongated member balanced in space between opposed helical springs attached to its opposed ends and aligned with the longitudinal axis of said elongated member, magnetic means fixed to said rigid elongated member and connected electrically to said impulses, a transformer having a primary and a pair of secondaries physically fixed and spaced apart from said rigid member, said transformer having a core which is fixed to said rigid member intermediate but free of contact with said primary and secondaries, means for imposing alternating current on said primary, means connecting said secondaries to operate said reciprocable member in response to movement of said core relative to said secondaries, and means connecting the end of said reciprocable member to the end of one of said helical springs to reset the position of said core in response to movement of said reciprocable member.

7. In an apparatus for controlling the movement of a movable member in response to an electric impulse, the combination which comprises a reversible electric motor connected to said movable member, a pair of relays connected to said electric motor, one such relay connected for forward and the other for reverse operation of said motor, a linear differential transformer having a primary and a pair of secondary windings and a movable core intermediate said primary and secondary, said secondary windings being approximately 180 degrees out of phase with one another, means for connecting said impulse to cause a linearly corresponding shifting movement of said core, and an amplifier connected to said secondaries having circuits sensitive to the distinct phases of said secondaries, each such circuit being connected to one of said relays to operate said motor either forward or in reverse, all in response to the magnitude and direction of movement of said core.

8. In an apparatus for controlling the movement of a movable member in response to an electric impulse, the combination which comprises a reversible electric motor connected to said movable member, a pair of relays connected to said electric motor, one such relay connected for forward and the other for reverse operation of said motor, a linear differential transformer having a primary and a pair of secondary windings and a movable core intermediate said primary and secondary, said secondary windings being approximately 180 degrees out of phase with one another, means for connecting said impulse to cause a linearly corresponding shifting movement of said core, an amplifier connected to said secondaries having circuits sensitive to the distinct phases of said secondaries, each such circuit being connected to one of said relays to operate said motor either forward or in reverse, all in response to the magnitude and direction of movement of said core, and connecting means extending from said movable member to said core for re-positioning said core in response to movement of said movable member.

9. In an apparatus for controlling the movement of a movable member in response to an electric impulse, the combination which comprises a reversible electric motor connected to said movable member, a pair of relays connected to said electric motor, one such relay connected for forward and the other for reverse operation of said motor, a linear differential transformer having a primary and a pair of secondary windings and a movable core intermediate said primary and secondary, a rigid elongated reciprocable rod fixed to said core, helical springs under tension affixed to the ends of said reciprocable rod, said secondary windings being approximately 180 degrees out of phase with one another, means for connecting said impulse to cause a linearly corresponding shifting movement of said core, an amplifier connected to said secondaries having circuits sensitive to the distinct phases of said secondaries, each such circuit being connected to one of said relays to operate said motor either forward or in reverse, all in response to the magnitude and direction of movement of said core, and means connecting said movable member to one of said springs.

10. In an apparatus for controlling the reciprocating movement of a valve stem in response to a direct current electric impulse, the combination which comprises a reversible electric motor connected to said valve stem, a pair of relays connected to said electric motor, one connected for forward and the other for reverse operation of said motor, each of said relays being throwable to operative position in response to an input of predetermined level and self-returning to an inoperative position at an input of a lower predetermined level, an amplifier connected for selective operation of said relays, a linear differential transformer having a primary and a pair of secondary windings and a movable core intermediate said primary and secondary, said secondary windings being approximately 180 degrees out of phase with one another, means for connecting said impulse to cause a linearly corresponding shifting movement of said core, and an amplifier connected to receive the output of said secondaries, said amplifier having circuits which are sensitive to the distinct phases of said secondaries, each such circuit being connected to one of said relays to operate said motor either forward or in reverse, all in response to the magnitude and direction of movement of said core, and connecting means in the form of a long helical range spring extending from said valve stem and connected to said core for re-positioning said core and regulating the output of said secondary windings in response to the movement of said valve stem, said core, range spring and valve stem being aligned along a common axis.

11. In an apparatus for controlling the reciprocating movement of a longitudinally reciprocable rack member in response to an electric impulse, the combination with comprises a reversible electric motor, a plurality of gears including a worm gear and a pinion meshed with said rack member, manually operable adjusting means fixed with respect to said worm gear for rotating said worm gear, a pair of relays connected to said electric motor, one connected for forward and the other for reverse operation of said motor, an amplifier connected for selective operation of said relays, a linear differential transformer having a hollow bore and a primary and a pair of secondary windings generally cylindrically arranged, means for energizing the primary of said transformer, an elongated, rigid rod extending axially through said bore free of contact with said transformer and having an iron core of uniform shape which is also free of contact with said transformer, a pair of helical tension springs attached to the opposed ends of said rod and arranged substantially in line with the axis of said rod, one of said springs having an end fixed and the other spring having its end attached to the end of said rack, said secondary windings being approximately 180 degrees out of phase with one another, an input signal coil fixed to said rigid rod, means for connecting said impulse to said input signal coil to cause a linearly corresponding shifting movement of said rod and core, and an amplifier connected to said secondaries having circuits sensitive to the distinct phases of said secondaries, each such circuit being connected to one of said relays to operate said motor either forward or in reverse, all in response to the magnitude and direction of movement of said core.

12. Apparatus for moving a movable member in response to variations in an electrical impulse, including in combination a rigid rod, means to position said rod in a neutral position, means attached to said rod and responsive to said electrical impulses to move said rod from said neutral position in a direction dependent upon said impulse, a transformer having a primary and a pair of secondaries physically fixed and spaced from said rod, means to energize said primary, a transformer core carried by said rod and movable relative to said primary and secondaries to thereby vary the output of said secondaries in one sense or an opposite sense from a neutral condition depending upon the direction of movement of said rod, mechanism responsive to the output of said secondaries operative to move said member, and means for connecting said rod for movement by said member, whereby as said member moves it will return said rod to its neutral position.

13. The combination of claim 12 in which said rod positioning means includes opposed resilient members, and in which said connecting means includes one of said resilient members.

References Cited in the file of this patent

UNITED STATES PATENTS

| | | |
|---|---|---|
| 2,285,463 | Ridgway | June 9, 1942 |
| 2,303,893 | Mullner | Dec. 1, 1942 |
| 2,503,017 | Wisman | Apr. 4, 1950 |
| 2,677,776 | Kohlhogen | May 4, 1954 |